United States Patent [19]

Amm

[11] Patent Number: 4,503,815

[45] Date of Patent: Mar. 12, 1985

[54] STRATIFIED CHARGE VARIABLE COMPRESSION RATIO ENGINE

[76] Inventor: Ronald M. Amm, 197 N. Ridge Rd., Durban, Natal, South Africa, 4001

[21] Appl. No.: 383,939

[22] Filed: Jun. 1, 1982

[30] Foreign Application Priority Data

Jun. 2, 1981 [GB] United Kingdom ............... 8116915

[51] Int. Cl.³ .............................................. F02B 75/00
[52] U.S. Cl. ................................ 123/48 A; 123/53 A; 123/78 A
[58] Field of Search ............... 123/53 R, 53 A, 53 BP, 123/78 R, 78 A, 48 R, 48 A

[56] References Cited

U.S. PATENT DOCUMENTS

| | | | |
|---|---|---|---|
| 1,245,808 | 11/1917 | Shoemaker | 123/53 A |
| 2,137,941 | 11/1938 | Helmore et al. | 123/53 A |
| 2,399,276 | 4/1946 | Kratzer | 123/78 A |

FOREIGN PATENT DOCUMENTS

| | | | |
|---|---|---|---|
| 0021170 | 1/1981 | European Pat. Off. | |
| 2337509 | 2/1975 | Fed. Rep. of Germany | |
| 1110808 | 2/1956 | France | |
| 1140686 | 1/1969 | United Kingdom | 123/53 R |

Primary Examiner—Craig R. Feinberg
Assistant Examiner—David A. Okonsky
Attorney, Agent, or Firm—Sandler & Greenblum

[57] ABSTRACT

An engine includes an engine block (10) provided with cylinders (12,14) having two pistons (16,18) and a cylinder head (19) having a piston (20) biased by means of torsion bars (24). The biased piston (20) is held in position by an arm (22) which is restrained by torsion bars (24). During the compression stroke of the engine the biased piston (20) is seated with faces (30,32), in contact and on ignition of the compressed mixture the biased piston (20) is lifted off the seat (32) creating a common combustion chamber in which separate charges are mixed. The biased piston (20) limits the combustion space and thereby controls the compression ratio to suit the desired performance.

8 Claims, 1 Drawing Figure

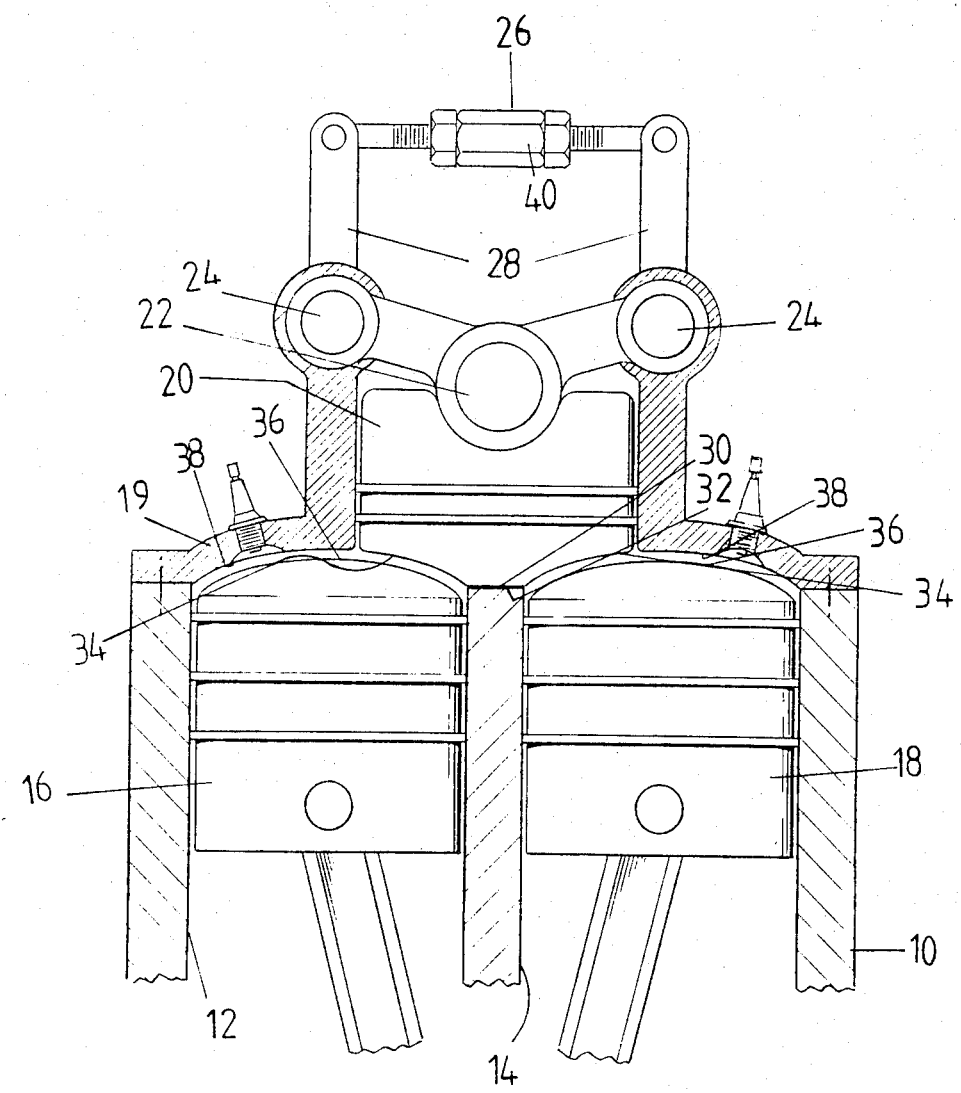

STRATIFIED CHARGE VARIABLE COMPRESSION RATIO ENGINE

This invention relates to a variable compression ratio engine.

The most pertinent prior art known to the Applicant is French Pat. No. 1 110 808 (di Giovanni) which teaches the principle of providing a second piston above a normal piston in a compression cylinder, the second piston acting against spring means to provide a resilient resistance to increased pressure in the combustion chamber. Thus, as the pressure in the combustion chamber exceeds a predetermined value, the second piston moves against the spring means and work is absorbed by the compressed spring. As the pressure in the combustion chamber decreases the stored work in the spring causes the second piston to move downwardly so that a higher mean effective pressure in the cylinder can be achieved.

It is an object of the present invention to provide an improvement over this prior art.

According to the invention there is provided an engine having adjacent cylinders of a plurality of cylinders straddled by a common chamber, closable by means of a closure device biased towards its closed position. In its closed position, the device separates the adjacent cylinders so that the charges in each cylinder can be varied insofar as composition, pressure and temperature or other parameters are concerned and allowing them to be mixed in the common chamber.

Completely different mixtures can be introduced into adjacent cylinders—for example, an ideally correct air/fuel mixture can be introduced into a first cylinder and any volume or composition of air or gases (for example exhaust gases) in a second cylinder. Although this arrangement affects the mixture in the common chamber it does not affect the initiation of the combustion of the mixtures in the individual combustion chambers. This permits a wide range of use of other fuels, introduction of air at ambient temperature and the like via the second or other cylinder to take up the heat generated (which is otherwise lost) and convert it to useful work, thereby reducing exhaust temperatures, improving fuel consumption and reducing pollution.

The biasing means may be adjustable and high pressure can be maintained in spite of lower combustion chamber temperatures.

The return of the closure device to its seated position in which it occupies all of the combustion chamber space means that all of the force of the burnt gases is used and no scavenging is required. The biasing means, which is preferably spring means imparts additional power to the downstroke or powerstroke of the piston or pistons.

The closure device may be a piston in a cylinder, the piston, in its seated position occupying all of the common combustion chamber of the operating cylinders.

In one form of the invention the closure device is positioned directly above the rims of adjacent cylinders giving adequate access to their respective charges as well as sufficient space for the valves in four stroke engines. The combustion chamber piston can be arranged to act against a spring with suitable damping arrangements to provide automatic variation of the compression pressures. The combustion chamber piston in its closed position, resting on the rims of the working pistons, would also be acting as a valve, separating the charges in each cylinder. In a four stroke engine during the exhaust stroke, the induction stroke and most of the compression stroke, the combustion chamber piston will remain firmly seated in its closed position.

In a simple arrangement with the combustion chamber piston spring loaded to close firmly onto the working pistons' rims, on the compression stroke, the two separate charges would be compressed in their respective chambers. On reaching a suitable pressure the air/fuel charge will be ignited, and with the pressure build up, the combustion chamber piston will be forced off its seat and the rising pistons would expel all their respective charges into the combustion chamber space provided by the rising combustion chamber piston. The pressure developed by the burning and mixing of the separate charges will be applied to the working pistons and as the pressure tends to drop during the power stroke the combustion chamber piston will be forced back onto its seat and in doing so provide a certain amount of extra thrust to the working pistons.

Embodiments of the invention enable the following advantage to be achieved:

1. Leaner overall mixtures can be burnt efficiently resulting in reduced fuel consumption.
2. More complete combustion and lower temperatures can be effected by the addition of the extra air, thus reducing pollution.
3. Higher cruising compression ratios can be achieved increasing efficiency and improving fuel consumption.
4. The change over for engine manufacturers to this arrangement can be a relatively simple exercise.
5. Energy absorbed by the combustion chamber springs is released as a useful gain in effectively extending the power stroke.

An embodiment of the invention is described below with reference to the accompanying drawing which is a diagrammatic section through an arrangement of the invention.

Referring to the drawing a cylinder block 10 is provided with two cylinders 12,14 and two pistons 16,18. Mounted on the cylinder block is a cylinder head 19 which carries a piston 20 biased by means of torsion bars 24.

The piston 20 is held in position by an arm 22 which in turn is restrained by torsion bars 24. These torsion bars are adjustable by the lockable mechanism 26 which is actuated through two cranks 28. The piston 20 has a seat 30 which seats on a portion 32 of the engine block 10. The biased piston 20 has two concave or scalloped surfaces 34 which are machined to complement the domed heads 36 of pistons 16,18, so that there is a minimum space between piston heads at top dead centre and the lower face of piston 20 when it is seated on the engine block 10.

The cylinder head 19 likewise has two concave surfaces 38 which complement the domed heads 36 of pistons 16,18 when these pistons are at top dead centre and piston 20 is at rest on the engine block 10.

The pistons 16,18 act in unison on a common crankshaft (not seen in the drawing).

Piston 16 can be described as a first piston. Piston 18 an be described as a second piston acting in a cylinder 14 where additional air or air/fuel or other desirable mixtures may be compressed to complement the combustion in cylinder 12. Piston 20 is described as a resiliently biased piston and is designed to provide the combustion chamber as it moves upwards.

The operation cycle will take place as follows using a spark ignition 4 stroke cycle:

Commencing with the compression stroke where piston 18 is rising in the cylinder against a closed head and a predetermined mixture of fuel and air, and with the biased piston 20 seated with faces 30 and 32 in contact. As the piston 16 approaches the top dead centre ignition takes place and the increase in pressure will lift the biased piston 20 off the seat 32, thus creating a common combustion chamber in which the separate charges are mixed. On the downward stroke of pistons 16 and 18 a point will be reached where the pressure drops in the cylinders to a value at which the biased piston 20 will re-seat on the portion of the engine block 10.

On the exhaust stroke pistons 16 and 18 will return to top dead centre where, with the biased piston 20 firmly seated, complete scavenging will be achieved by virtue of the minimum clearance above both pistons 16 and 18.

The following downward (induction) stroke of pistons 16 and 18 will introduce the fuel/air mixture into cylinder 12 and any other desirable mixture into cylinder 14.

The final return or compression stroke then takes places and the four cycles are repeated.

The biased piston 20, which in effect, limits the combustion space and thereby controls the compression ratio may be adjusted to suit the desired performance. Reference to the drawing will reveal how the bias on the piston 20 may be altered by adjustment of the contrathreaded turnbuckle 40.

A refinement of the invention could be achieved by actuating the adjustment 26 by hydraulics or replacing the adjustment 26 with an hydraulic cylinder which could also enable the bias to be altered automatically during the cycle.

A further refinement would be to cushion the movement of the biased piston 20 by means of some dampending device either by hydraulic or pneumatic devices.

As a variation and for maximum power suitable fuel/air mixtures may be introduced into both cylinders 12,14 and as such the unit would operate simply as a variable compression engine with the spring mechanism or torsion bars 24 absorbing a portion of the high initial cylinder pressure created on combustion, and returning this energy later on in the working stroke by the downward movement of the biased piston 20. The net effect would be to reduce the maximum pressure and increase the mean effective pressure.

The invention may be applied to compression ignition engines including diesel engines.

Although the above description has referred to a biased piston 20 it will be appreciated that other deformable closure devices may be employed—for example a diaphragm (of suitable material or suitably protected to withstand the heat), which may be controlled by spring, pneumatic or hydaulic means.

I claim:

1. An internal combustion engine, adapted to ignite gases therein, comprising:
   (a) at least two pistons;
   (b) at least two adjacent cylinders, each adapted to receive gases, one of said pistons being positioned in each of said cylinders wherein said pistons are adapted to reciprocate in unison in the same direction in said adjacent cylinders; and
   (c) a chamber straddling said adjacent cylinders and comprising a closure member biased into a seated position in which said cylinders are isolated from each other, and wherein said closure member is adapted to move from said seated position to an unseated position in which said cylinders communicate with one another, in response to a predetermined pressure of gases in said cylinders after ignition of said gases, wherein said pistons comprise means for moving all of said gases in said two cylinders into said chamber to continue combustion after ignition when said pistons reach their maximum extension toward said chamber, and wherein said pistons move away from said chamber in response to a predetermined pressure of combusting gases in said chamber, wherein said engine further comprises a biasing means for moving said closure member into its seated position during said movement of said pistons away from said chamber, thereby expelling all of said combusting gases into said cylinders.

2. The internal combustion engine defined by claim 1 further comprising biasing means for biasing said closure member into said seated position, wherein said biasing means comprises pneumatically actuated means.

3. The internal combustion engine defined by claim 1 wherein said pistons have an upper surface and said closure member has a lower surface of a complementary shape to the shape of said upper surfaces of said pistons, so as to produce a minimum clearance between said upper surfaces of said pistons and said lower surface of said closure member when said closure member is in said seated position.

4. The engine defined by claim 1 further comprising at least two spark plug means, one in each cylinder, for igniting said gases while said closure means is in said seated position.

5. The engine defined by claim 4 wherein said closure means moves from said seated to said unseated position only after said gases have ignited in said cylinders.

6. The internal combustion engine defined by claim 1, wherein said cylinders comprise a common wall therebetween and said closure member comprises an auxiliary piston, resiliently biased to said seated position in which said auxiliary piston is sealingly seated on said common wall, and wherein said auxiliary piston is adapted to reciprocate between the seated and unseated positions.

7. The internal combustion engine defined by claim 6 wherein said pistons are adapted to occupy exhaust, induction, compression, and working strokes in said cylinders, and wherein said engine further comprises a spring biasing means for resiliently biasing said auxiliary piston to its seated position to separate said adjacent cylinders during said exhaust, induction and compression strokes of said engine, and wherein said auxiliary piston is adapted to move to said unseated position so as to form said common combustion chamber of variable volume during said working stroke of the pistons.

8. The internal combustion engine defined by claim 7 wherein said at least two cylinders are adapted to be fed with separate charges of a combustible material.

* * * * *